United States Patent Office 3,401,187
Patented Sept. 10, 1968

3,401,187
PROCESS FOR MAKING TETRAMETHYL LEAD
Rudolph L. Pedrotti, Newark, Del., assignor to E. I. du Pont de Nemours and Company, Wilmington, Del., a corporation of Delaware
No Drawing. Filed June 15, 1965, Ser. No. 464,193
9 Claims. (Cl. 260—437)

ABSTRACT OF THE DISCLOSURE

Production of tetramethyl lead by the reaction of monosodium lead alloy with methyl chloride in the presence of a catalyst system consisting essentially of ammonia, an alkanenitrile and water.

---

This invention relates to the manufacture of tetramethyl lead, more particularly to its manufacture by the reaction of methyl chloride with monosodium lead alloy in the presence of a novel catalyst system which consists essentially of ammonia as the catalyst and an alkanenitrile as a catalyst promotor which system is highly effective under mild conditions.

Tetramethyl lead (TML) is now in demand as an antiknock agent. Its manufacture, however, poses difficulties as discussed by Jarvie et al. in U.S. Patent 3,048,610, Tullio in U.S. Patents 3,072,694 and 3,072,695, and Cook et al. in U.S. Patent 3,049,558. This art suggests that the methyl chloride-monosodium lead alloy system is unique since it requires catalysis and that certain metal compounds are effective to produce tetramethyl lead. The disclosed processes, however, including the commercial processes involving aluminum compounds, are not entirely satisfactory, mainly because they require high temperatures of the order of 80° C. to 110° C. at 250–350 p.s.i.g. and long reaction times of the order of 2 to 2.5 hours. This necessitates expensive pressure systems for practical and safe operation. Also, the alkyl aluminum derivatives formed in the reaction mass are sensitive to air and moisture and tend to ignite spontaneously on exposure to the atmosphere.

It has been proposed to employ nitriles as catalysts for the production of tetraethyl lead by the reaction of ethyl halides with sodium lead alloy containing 14.3% sodium in the presence of a solution of a strong base such as sodium hydroxide (Williams et al. in U.S. Patent 1,550,940), and with a potassium-sodium lead alloy (Shapiro et al. in U.S. Patent 2,635,106) but not with monosodium lead alloy. However, the art does not teach the use of nitriles as promoters of the ammonia catalyzed reaction of methyl chloride with monosodium lead alloy.

Rudolph L. Pedrotti and Charles L. Sandy, in their copending application, Ser. No. 293,138, filed July 5, 1963, now U.S. Patent 3,281,442, disclosed that ammonia is an effective catalyst for the methyl chloride-monosodium lead alloy reaction at moderate temperatures and pressures; and that certain hydroxylic compounds in limited amounts are effective catalyst promoters in such system. This invention is an improvement over said process of Pedrotti and Sandy and is based on the discovery of a novel class of promoters for said ammonia catalyzed system.

It is an object of the present invention to provide a new and improved process for the manufacture of tetramethyl lead. Another object is to provide such a process which involves the use of a novel class of promoters for the ammonia catalyzed reaction of methyl chloride with monosodium lead alloy. A further object is to provide a catalytic process for reacting methyl chloride with monosodium lead alloy wherein the reaction is initiated smoothly and safely at relatively low temperatures and proceeds rapidly and smoothly under mild conditions of temperature and pressure to produce tetramethyl lead in high yields. Other objects are to advance the art. Still other objects will appear hereinafter.

The above and other objects of this invention are accomplished by the process for making tetramethyl lead which comprises reacting monosodium lead alloy with:

(A) A methylating agent which consists essentially of methyl chloride in the liquid phase, employing at least about 1 mole of methyl chloride per mole of alloy.

(B) At a temperature of from about 25° C. to about 85° C.

(C) In the presence of a catalyst system which consists essentially of (a) from 0.01 to about 1.5 moles of ammonia per mole of alloy, (b) from 0.01 to about 1 mole of an alkanenitrile of 2–8 carbon atoms per mole of ammonia, and (c) from 0 to about 0.04 mole of water per mole of alloy, but not more than 0.3% by weight based on the methyl chloride.

By this process, the methylation is effected smoothly and rapidly under mild conditions. In general, temperatures can be lower and reaction times shorter, while the yields of tetramethyl lead are as high or higher than in the prior art aluminum-catalyzed processes. Moreover, the present catalyst system avoids the hazards involved in handling and processing aluminum catalysts and the reaction masses produced therefrom. Thus, the manufacture of tetramethyl lead is made significantly more safe, practical and economic. Also, the ammonia plus nitrile combination effects the methylation reaction more quickly and produces TML in better yields than either component alone under comparable conditions.

The presence of ammonia in the catalyst system is critical. Without it, practically no tetramethyl lead is produced. Broadly, the quantity of ammonia will correspond to 0.01 to about 1.5 moles per mole of alloy, the actual amount depending on such factors as the amount of methyl chloride used, the temperature and time of reaction and the nature and proportion of the promoter components. More usually, the molar ratio of ammonia to alloy ranges from about 0.03 to about 0.3. In general, the lower the ammonia to alloy ratio, the higher the specificity of the reaction, that is, the higher the ratio of the conversion of alloy to tetramethyl lead to the total conversion of alloy to all products, less alloy being consumed in side reactions to produce other products. On the other hand, sufficient ammonia is normally needed to provide reasonable rates of tetramethyl lead formation. The reaction variables are easily coordinated to produce tetramethyl lead rapidly in high yields under extremely mild conditions of temperature and pressure. For example, particularly good results are obtained in the preferred embodiments with ammonia to alloy molar ratios in the range of about 0.05 to about 0.3 at temperatures of from about 25° C. to about 85° C.

It has been discovered that alkanenitriles in controlled proportions as defined exert a cocatalyst effect to promote and increase the rate of the ammonia-catalyzed reaction and/or the specificity of that reaction, although such nitriles do not show any appreciable effect when used in the absence of the ammonia. The ammonia-nitrile combination catalyst system effects the methylation reaction at low temperatures of from about 25° C. to about 85° C. and low autogenous pressures of from about 100 to about 300 p.s.i.g. preferably from about 25° C. to about 50° C. Lower temperatures, e.g., 0° C., can be used but the reaction rate will be undesirably slow. Higher temperatures, up to about 120° C., may be used but usually are unnecessary and involve much higher pressures. Reaction mass temperatures are readily controlled by controlling the amount and schedule of catalyst addition, by cooling where necessary and by refluxing methyl chloride, to keep the internal pressure at safe levels, for example 300 p.s.i.g. or below.

Alkanenitriles, having 2–8 carbon atoms are readily available, suitable and usually will be used as the catalyst promoters, preferably those having 2–5 carbon atoms. Such alkanenitriles may also be represented by the formula RCN wherein R is an alkyl radical of 1–7 carbon atoms, preferably 1–4 carbon atoms. Other carboxylic acid nitriles such as the higher molecular stearonitrile can be used. Typical examples are ethanenitrile (MeCN) (more commonly known as acetonitrile and methyl cyanide), n-propanenitrile (EtCN), n-butanenitrile (PrCN), 2-methylpropanenitrile, 2,2 - dimethylpropanenitrile (t-BuCN), pentanenitrile, 3-methylbutanenitrile, hexanenitrile, octanenitrile, and 2-ethylhexanenitrile. Acetonitrile is particularly preferred.

The quantity of alkanenitrile employed can vary considerably depending upon the amount of methyl chloride used, the temperature and time of reaction and the particular alkanenitrile used as the catalyst promoter. Usually, there will be employed from about 0.01 to about 1 mole of the alkanenitrile per mole of ammonia, preferably from about 0.03 to about 1 mole per mole of ammonia, and most preferably from about 0.03 to about 0.3 mole per mole of ammonia.

The catalyst promoters, disclosed by Pedrotti and Sandy in their copending application, Ser. No. 293,138, also can be used in the process of this invention in addition to the alkanenitriles, but are not necessary. Such promoters disclosed by Pedrotti and Sandy are water and monohydroxylic organic compounds composed of carbon, hydrogen and one or more oxygens containing up to 18 carbon atoms and no oxygens other than ether and hydroxyl oxygens. Thus, in contrast to the prior practice regarding the alkylation of monosodium lead alloy, it is not critical for practical operation to exclude or limit moisture to very low levels. This has a commercially important advantage because the methyl chloride ordinarily contains small amounts of water and it is not economically practical to provide completely anhydrous methyl chloride. Methyl chloride containing 50 p.p.m. or less of water, is generally considered in this art to be substantially anhydrous. For example, in the methylation reaction involving aluminum-type catalysts, it is normally considered desirable to limit the water content of the methyl chloride to less than about 150 p.p.m. water (0.015% weight) and in general to operate as anhydrously as possible. Substantially larger water levels may, if desired, be present in the methyl chloride according to the present invention, for example on the order of 500 to 3000 p.p.m., 0.05% to 0.3% by weight, provided of course that the total water introduced into the reaction mixture does not amount to more than about 0.04 mole per mole of alloy and does not exceed about 0.3% by weight of the MeCl. The presence of gross water tends to depress the yields of tetramethyl lead markedly. Usual water to alloy ratios are in the range 0.00014–0.025 mole. Based on MeCl, the usual range is about 50 to about 3000 p.p.m., about 0.005% to about 0.3% by weight, particularly about 100 to about 1000 p.p.m., about 0.01% to about 0.1% by weight.

The term methyl halide methylating agent consisting essentially of methyl chloride includes methyl chloride as the essential source of methyl groups and mixtures thereof with up to about 5 mole percent of methyl iodide based on the methyl chloride, more usually less than about 1 mole percent of said methyl iodide. Such small proportions of such methyl iodide, e.g., 0.1–1 mole percent may have beneficial effects. For example, methyl iodide appears effective at low temperatures in conjunction with said ammonia catalyst to accelerate the methylation reaction and thereby increase the rate of production of tetramethyl lead. While the iodide may be present in small proportions as above, the ammonia catalyzed process appears unique for methyl chloride as the essential methylating agent.

The methylating agent is normally employed in amounts of at least about one mole and usually not more than about 6 moles per mole of alloy. Larger quantities, up to 20 moles, may be used but are not necessary. Preferred ratios are in the range of about 1.3 to about 4 moles of methyl chloride per mole of alloy.

The monosodium lead alloy (NaPb) to be used in this process, i.e., containing 50 mole percent Na and 50 mole percent Pb, or on a weight basis 10% weight Na and 90% weight Pb, has been amply described in the art. It may be used in various forms, usually comminuted, including ground as disclosed by Stecher in U.S. Patent 2,134,091, flaked as disclosed by Pyk in U.S. Patent 2,561,636 or by Tanner in U.S. Patent 2,635,107, and quenched (in MeCl) as described by Mattison in U.S. Patent 2,744,126.

Broadly, the overall process comprises (1) mixing the monosodium lead alloy, methyl chloride, ammonia and the alkanenitrile promoter, (2) holding such mixture at a temperature in the range of about 25° C. to about 85° C. at which the reaction is initiated and proceeds at a reasonable rate, and (3) recovering the tetramethyl lead from the reaction mass. Normally, the reaction is effected under agitation and it is usually desirable to effect the reaction in the presence of an inert solid, such as graphite, as an internal lubricant. From about 1% to about 5% by weight of graphite based on the alloy may be used, depending on the dimensions of the reactor, the effectiveness of the agitation means, and the proportions of the reactants. There may also be present a thermal stabilizer for tetramethyl lead, as described in the art by Jarvie et al. in U.S. Patent 3,048,610 and Cook et al. in U.S. Patent 3,049,558, for example a volatile hydrocarbon such as toluene or isooctane having boiling characteristics comparable to those of tetramethyl lead.

The reactants, catalyst components and other agents (as described above) may be introduced separately or together, all at once or gradually during the course of the reaction. The ammonia and the alkanenitrile cocatalyst components may be added as such or in a carrier which conveniently may be the methylating agent or an inert solvent including the thermal stabilizers toluene and isooctane. Ammonia, normally gaseous like methyl chloride, may be charged to the reactor as condensed liquid or as pressurized vapor.

The reaction mass components may be mixed at low temperatures at which the reaction does not proceed at a substantial rate, e.g., below 0° C., and the mixture then brought to operating temperatures. Or the reactants and other essential components may be brought into contact at temperatures within the 25° C. to 85° C. normal operating range, preferably in the preferred 25° C. to 50° C. range. The reaction may be conducted batchwise or continuously.

The resulting reaction mass may be worked up in the usual ways described in the art. Normally, the residual methyl chloride is vented from the charge at a temperature in the range of about 25° C. to about 60° C., and passed to a recovery system as in tetraethyl lead technology. For this purpose, the temperature of the reaction mixture is adjusted accordingly, if necessary. The tetramethyl lead product is then recovered by solvent extraction, e.g., with toluene or by steam distillation according to the well-known techniques.

In order to more clearly illustrate this invention and advantageous results to be obtained thereby, the following examples are given in which the parts and proportions are by weight, except where specifically indicated otherwise.

Example 1

A stainless steel bomb was charged with 100 parts crushed 10 on 20 mesh monosodium lead alloy enclosed in a glass ampoule, sealed and evacuated to 0.05 mm. Hg. The bomb was then cooled with solid carbon dioxide (−78° C.) and further charged with ammonia in quantities described below, 4.15 parts toluene, 41.3 parts methyl chloride containing 25 p.p.m. water, and either of acetonitrile (MeCN), n-butanenitrile (n-PrCN), or 2,2-dimethylpropanenitrile (t-BuCN). In this system, the bomb volume was such that the methyl chloride loading density was 0.16 gram/cc. bomb space. The sealed bomb was warmed to 0° C., struck sharply against a solid object to break the ampoule, placed in a 50° C. bath and shaken vigorously for agitation. Reaction was terminated by cooling to −78° C. The bomb was opened and its contents analyzed for alloy conversion and tetramethyl lead (TML) yield.

ALKANENITRILE - PROMOTED AMMONIA - CATALYZED SODIUM LEAD ALLOY METHYLATION
MeCl/NaPb molar ratio=1.88/1
NH₃ concentration=As given below
Nitrile and concentration=As given below
Temperature/time=50° C./0.5 or 1 hr.

| NH₃/NaPb molar ratio | Nitrile RCN | RCN/NH₃ molar ratio | Reaction time (hr.) | TML yield, percent | Alloy conversion, percent |
|---|---|---|---|---|---|
| .068 | | | 0.5 | 86.6 | 91.2 |
| .068 | MeCN | .10 | 0.5 | 90.7 | 94.3 |
| .068 | n-PrCN | .03 | 0.5 | 88.4 | 93.2 |
| .038 | | | 1 | 70.9 | 73.2 |
| .038 | t-BuCN | .045 | 1 | 78.0 | 84.2 |

In contrast the TML yield is practically nil when (a) ammonia is omitted and acetonitrile alone is employed in amounts comparable to those given above, or (b) both ammonia and nitrile are omitted in the above experiments.

Example 2

The procedure described under Example 1 was used with 3.5 moles MeCl/NaPb, .064 mole NH₃/NaPb, and MeCN in quantities below at 25° C. or 50° C. for ½ hour, the MeCl containing about 50 p.p.m. water.

| Molar MeCN/NH₃ | Temperature, ° C. | TML yield, percent | Alloy conversion, percent |
|---|---|---|---|
| | 25 | 44 | 49 |
| | 50 | 88 | 96 |
| .15 | 25 | 78 | 84 |
| .15 | 50 | 91 | 94 |
| .30 | 50 | 92 | 96 |

It will be understood that the preceding examples have been given for illustrative and comparative purposes solely and that this invention is not limited to the specific embodiments described therein. On the other hand, it will be apparent to those skilled in the art, that, subject to the limitations set forth in the general description, many variations and modifications can be made in the proportions, materials, conditions, apparatus and techniques employed without departing from the spirit or scope of this invention.

From the foregoing description, it will be apparent that this invention provides a new and improved process for making tetramethyl lead employing a novel catalyst system. The use of such catalyst system, particularly of the novel catalyst promoters, makes it possible to efficiently manufacture tetramethyl lead in high yields and purity under conditions that are milder and less hazardous than were possible heretobefore. Also, the process requires only short reaction times, resulting in faster production and greater capacity of the equipment and the use of less costly equipment designed to withstand lower pressures. Particularly, the process of this invention results in important economic advantages. Accordingly, this invention constitutes a valuable advance in and contribution to the art.

The embodiments of the invention in which an exclusive property or privilege is claimed are defined as follows:

1. The process for making tetramethyl lead which comprises reacting monosodium lead alloy with:
    (A) a methylating agent which consists essentially of methyl chloride in the liquid phase, employing at least about 1 mole of methyl chloride per mole of alloy,
    (B) at a temperature of from about 25° C. to about 85° C.,
    (C) in the presence of a catalyst system which consists essentially of:
        (a) from 0.01 to about 1.5 moles of ammonia per mole of alloy,
        (b) from 0.01 to about 1 mole of an alkanenitrile of 2–8 carbon atoms per mole of ammonia, and
        (c) from 0 to about 0.04 mole of water per mole of alloy, but not more than 0.3% by weight based on the methyl chloride.

2. The process for making tetramethyl lead which comprises reacting monosodium lead alloy with:
    (A) a methylating agent which consists essentially of methyl chloride in the liquid phase, employing from about 1.3 to about 4 moles of methyl chloride per mole of alloy,
    (B) at a temperature of from about 25° C. to about 85° C.
    (C) in the presence of a catalyst system which consists essentially of:
        (a) from 0.01 to about 1.5 moles of ammonia per mole of alloy,
        (b) from 0.01 to about 1 mole of an alkanenitrile of 2–5 carbon atoms per mole of ammonia, and
        (c) from 0 to about 0.04 mole of water per mole of alloy, but not more than 0.3% by weight based on the methyl chloride.

3. The process for making tetramethyl lead which comprises reacting monosodium lead alloy with:
    (A) a methylating agent which consists essentially of methyl chloride in the liquid phase, employing from about 1.3 to about 4 moles of methyl chloride per mole of alloy,
    (B) at a temperature of from about 25° C. to about 85° C.
    (C) in the presence of a catalyst sytem which consists essentially of:
        (a) from 0.01 to about 1.5 moles of ammonia per mole of alloy,
        (b) from 0.01 to about 1 mole of acetonitrile per mole of ammonia, and
        (c) from 0 to about 0.04 mole of water per mole of alloy, but not more than 0.3% by weight based on the methyl chloride.

4. The process for making tetramethyl lead which comprises reacting monosodium lead alloy with:
    (A) a methylating agent which consists essentially of methyl chloride in the liquid phase, employing from about 1.3 to about 4 moles of methyl chloride per mole of alloy,
    (B) at a temperature of from about 25° C. to about 85° C.
    (C) in the presence of a catalyst system which consists essentially of:
        (a) from about 0.03 to about 0.3 mole of ammonia per mole of alloy,
        (b) from about 0.03 to about 1 mole of an alkanenitrile of 2–5 carbon atoms per mole of ammonia, and
        (c) from 0 to about 0.04 mole of water per mole of alloy, but not more than 0.3% by weight based on the methyl chloride.

5. The process for making tetramethyl lead which comprises reacting monosodium lead alloy with:
    (A) a methylating agent which consists essentially of methyl chloride in the liquid phase, employing from about 1.3 to about 4 moles of methyl chloride per mole of alloy,
(B) at a temperature of from about 25° C. to about 50° C.
(C) in the presence of a catalyst system which consists essentially of:
    (a) from about 0.03 to about 0.3 mole of ammonia per mole of alloy,
    (b) from about 0.03 to about 0.3 mole of an alkanenitrile of 2–5 carbon atoms per mole of ammonia, and
    (c) from 0 to about 0.04 mole of water per mole of alloy, but not more than 0.3% by weight based on the methyl chloride.

6. The process for making tetramethyl lead which comprises reacting monosodium lead alloy with:
(A) a methylating agent which consists essentially of methyl chloride in the liquid phase, employing from about 1.3 to about 4 moles of methyl chloride per mole of alloy,
(B) at a temperature of from about 25° C. to about 85° C.
(C) in the presence of a catalyst system which consists essentially of:
    (a) from about 0.03 to about 0.3 mole of ammonia per mole of alloy,
    (b) from about 0.03 to about 1 mole of acetonitrile per mole of ammonia, and
    (c) from 0 to about 0.04 mole of water per mole of alloy, but not more than 0.3% by weight based on the methyl chloride.

7. The process for making tetramethyl lead which comprises reacting monosodium lead alloy with:
(A) a methylating agent which consists essentially of methyl chloride in the liquid phase, employing from about 1.3 to about 4 moles of methyl chloride per mole of alloy,
(B) at a temperature of from about 25° C. to about 50° C.
(C) in a catalyst system which consists essentially of:
    (a) from about 0.03 to about 0.3 mole of ammonia per mole of alloy,
    (b) from about 0.03 to about 0.3 mole of acetonitrile per mole of ammonia, and
    (c) from 0 to about 0.04 mole of water per mole of alloy, but not more than 0.3% by weight based on the methyl chloride.

8. The process for making tetramethyl lead which comprises reacting monosodium lead alloy with:
(A) a methylating agent which consists essentially of methyl chloride in the liquid phase, employing from about 1.3 to about 4 moles of methyl chloride per mole of alloy,
(B) at a temperature of from about 25° C to about 50° C.
(C) in a catalyst system which consists essentially of:
    (a) from about 0.03 to about 0.3 mole of ammonia per mole of alloy,
    (b) from about 0.03 to about 0.3 mole of n-butanenitrile per mole of ammonia, and
    (c) from 0 to about 0.04 mole of water per mole of alloy, but not more than 0.3% by weight based on the methyl chloride.

9. The process for making tetramethyl lead which comprises reacting monosodium lead alloy with:
(A) a methylating agent which consists essentially of methyl chloride in the liquid phase, employing from about 1.3 to about 4 moles of methyl chloride per mole of alloy,
(B) at a temperature of from about 25° C. to about 50° C.
(C) in a catalyst system which consists essentially of:
    (a) from about 0.03 to about 0.3 mole of ammonia per mole of alloy,
    (b) from about 0.03 to about 0.3 mole of 2,2-dimethylpropanenitrile per mole of ammonia, and
    (c) from 0 to about 0.04 mole of water per mole of alloy, but not more than 0.3% by weight based on the methyl chloride.

References Cited

UNITED STATES PATENTS

| | | | |
|---|---|---|---|
| 1,550,940 | 8/1925 | Williams et al. | 260—437 |
| 1,622,228 | 3/1927 | Midgley | 260—437 |
| 2,635,106 | 4/1953 | Shapiro et al. | 260—437 |
| 3,281,442 | 10/1966 | Pedrotti et al. | 260—437 |

TOBIAS E. LEVOW, *Primary Examiner.*

H. M. S. SNEED, *Assistant Examiner.*